(12) United States Patent
Braun et al.

(10) Patent No.: US 11,927,034 B2
(45) Date of Patent: Mar. 12, 2024

(54) TOOL AND METHOD FOR INSTALLING A DOOR STRIKER PIN IN A VEHICLE

(71) Applicant: CNH Industrial America LLC, New Holland, PA (US)

(72) Inventors: Michael Braun, Oswego, IL (US); Robert van der Linde, Aurora, IL (US); Sean Steuck, Greendale, WI (US); Sands Ruffalo, III, Union Grove, WI (US); Russell E. Cederberg, Plainfield, IL (US); Peter Burelbach, Glen Ellyn, IL (US); Lorenzo Gomez, Schiller Park, IL (US); Adnan Shamim, North Aurora, IL (US); Jared Kempken, Burlington, WI (US)

(73) Assignee: CNH Industrial America LLC, New Holland, PA (US)

( * ) Notice: Subject to any disclaimer, the term of this patent is extended or adjusted under 35 U.S.C. 154(b) by 210 days.

(21) Appl. No.: 17/145,901

(22) Filed: Jan. 11, 2021

(65) Prior Publication Data

US 2022/0220781 A1 Jul. 14, 2022

(51) Int. Cl.
*E05B 79/08* (2014.01)
*B60J 5/04* (2006.01)
*B62D 65/06* (2006.01)
*E05B 85/04* (2014.01)

(52) U.S. Cl.
CPC ............ *E05B 79/08* (2013.01); *B60J 5/0468* (2013.01); *B62D 65/06* (2013.01); *E05B 85/04* (2013.01)

(58) Field of Classification Search
CPC ......... Y10T 29/49902; Y10T 29/49895; Y10T 29/29826; Y10T 29/4978; B62D 65/06; E05B 79/08; E05B 85/04; B60J 5/0468
USPC ........................................................ 29/271
See application file for complete search history.

(56) References Cited

U.S. PATENT DOCUMENTS

| 5,282,305 | A | 2/1994 | Nutt et al. |
| 6,029,335 | A | 2/2000 | Hui et al. |
| 6,279,218 | B1 | 8/2001 | Lezuch et al. |
| 6,324,948 | B1 * | 12/2001 | Kavc ............ E05B 17/06 |
| | | | 81/484 |
| 8,443,523 | B2 | 5/2013 | Lam et al. |

(Continued)

FOREIGN PATENT DOCUMENTS

| CN | 207917017 U | 9/2018 |
| JP | 3050373 B2 | 3/2000 |

(Continued)

*Primary Examiner* — Tom Rodgers
(74) *Attorney, Agent, or Firm* — Rickard K. DeMille; Rebecca L. Henkel (57) ABSTRACT

A tool for installing a door striker pin includes: a latch engagement section having a first surface, a striker pin extending from the first surface, and an abutment surface that extends generally orthogonal to the first surface; and a pin positioning section coupled to the latch engagement section and including a positioning surface with a striker pin slot formed therethrough that extends in parallel with the striker pin. The striker pin slot is positioned in the positioning surface such that the striker pin slot is aligned with a striker pin installation location when the striker pin of the latch engagement section is engaged with a latch of a door and the abutment surface rests against a frame to which the door is pivotably coupled.

12 Claims, 5 Drawing Sheets

(56) References Cited

U.S. PATENT DOCUMENTS 9,308,954 B2 4/2016 Wilkens et al.
2014/0053388 A1 2/2014 Mazzei

FOREIGN PATENT DOCUMENTS

| JP | 2001-1962 A | 9/2001 |
| JP | 2013-139177 A | 7/2013 |
| KR | 10-2012-0030737 | 3/2012 |
| KR | 10-2019-0006768 | 1/2019 |

* cited by examiner

TOOL AND METHOD FOR INSTALLING A DOOR STRIKER PIN IN A VEHICLE

BACKGROUND OF THE INVENTION

The present invention pertains to tools for vehicles and, more specifically, to tools and methods for installing a striker pin that interacts with a latch of a door.

Many vehicles include a door with a latch. To close the door and keep it securely closed, the latch engages a striker pin that is carried by the frame of the vehicle. If the latch and the striker pin are not properly aligned, the door may fail to securely close and/or may not be able to close at all.

What is needed in the art is a way to reliably and accurately install a striker pin in a vehicle so the door can be securely closed.

SUMMARY OF THE INVENTION

Exemplary embodiments provided according to the present disclosure include a tool that has a striker pin that can engage a latch of a door so a striker pin slot of the tool can be positioned in alignment with a striker pin installation location when the striker pin is engaged with the latch and an abutment surface of the tool rests against a frame to which the door is pivotably coupled.

In some exemplary embodiments provided in accordance with the present disclosure, a tool for installing a door striker pin includes: a latch engagement section having a first surface, a striker pin extending from the first surface, and an abutment surface that extends generally orthogonal to the first surface; and a pin positioning section coupled to the latch engagement section and including a positioning surface with a striker pin slot formed therethrough that extends in parallel with the striker pin. The striker pin slot is positioned in the positioning surface such that the striker pin slot is aligned with a striker pin installation location when the striker pin of the latch engagement section is engaged with a latch of a door and the abutment surface rests against a frame to which the door is pivotably coupled.

In some exemplary embodiments provided in accordance with the present disclosure, a door assembly for a vehicle includes: a frame including a first frame member coupled to a second frame member, the second frame member having a door striker pin slot; a door pivotably coupled to the first frame member and including a latch; a tool including a latch engagement section having a first surface, a striker pin extending from the first surface and engaged with the latch, and an abutment surface extending generally orthogonal to the first surface and abutting against the second frame member; and a pin positioning section coupled to the latch engagement section and having a positioning surface with a striker pin slot formed therethrough that extends in parallel with the striker pin, the striker pin slot being aligned with the door striker pin slot; and a door striker pin held in the striker pin slot and the door striker pin slot. The door striker pin is positioned such that the latch of the door is engageably aligned with the door striker pin.

In some exemplary embodiments provided in accordance with the present disclosure, a method of using a tool to install at least one door striker pin in at least one vehicle is provided. The at least one vehicle includes a first vehicle having a frame with a first frame member and a second frame member and a door pivotably coupled to the first frame member and including a latch. The method includes: placing a door striker pin in a striker pin slot of the tool; engaging a striker pin of the tool with the latch of the door; abutting the tool against the second frame member; and fixating the door striker pin to the second frame member while the door striker pin is placed in the striker pin slot, the striker pin is engaged with the latch of the door, and the tool is abutted against the second frame member.

One possible advantage that may be realized by exemplary embodiments provided according to the present disclosure is that the tool can be used to quickly install a door striker pin in the correct position without requiring an installer to install the door striker pin by "trial and error".

Another possible advantage that may be realized by exemplary embodiments provided according to the present disclosure is that the tool can be used to install door striker pins in various vehicles so the door of each vehicle has the same closing force.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
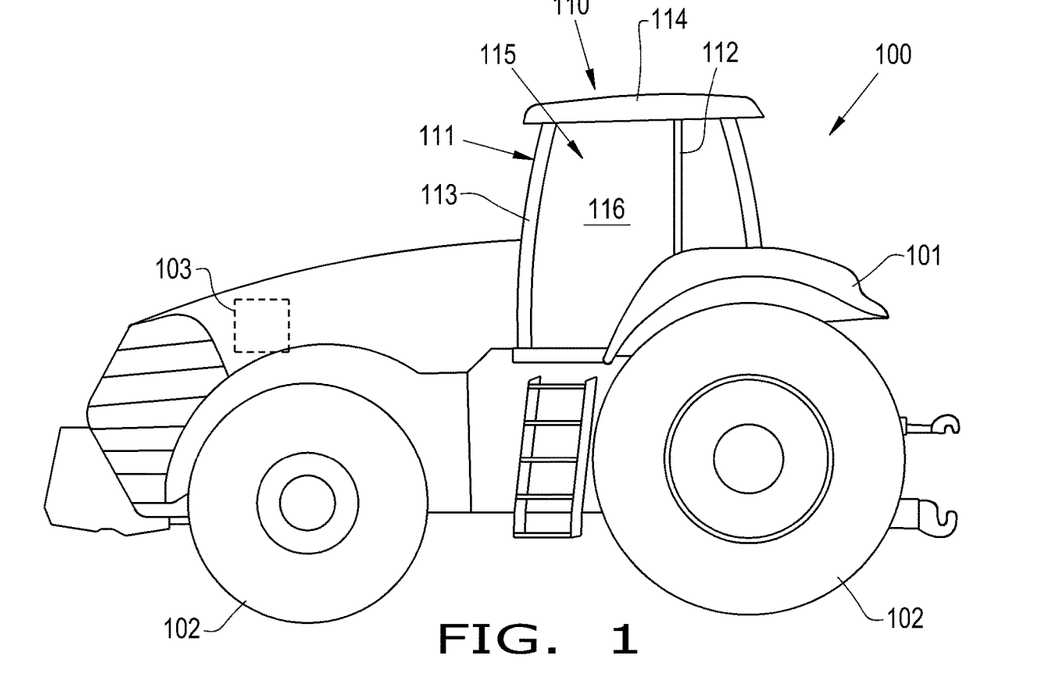
FIG. 1 illustrates a side view of an exemplary embodiment of a vehicle with a door assembly installed, provided in accordance with the present disclosure.

Referring now to the drawings, and more particularly to FIG. 1, an exemplary embodiment of a vehicle 100, illustrated in the form of a tractor, provided according to the present disclosure is illustrated. The vehicle 100 includes a chassis 101 and an operator cab 110 that is carried by the chassis 101. Various controls for the work vehicle 100 may be placed in the operator cab 110, as is known. The chassis 101 may be supported by multiple pairs of wheels 102, which are linked to an engine 103 by a transmission to propel the vehicle 100. It should be appreciated that while the vehicle 100 is illustrated and described as being in the form of a tractor, the vehicle provided according to the present disclosure can take other forms, including but not limited to an automobile, a semi-truck, an agricultural harvester, a skid loader, a dozer, etc.

The operator cab 110 includes a frame 111 that has two frame members, illustrated as a first frame member 112 and a second frame member 113, and a roof 114. The frame members 112, 113 and the roof 114 define a door opening therebetween. A door assembly 115 includes a door 116 that is pivotably coupled to, for example, the first frame member 112 and can be pivoted to open and close the door opening.

In known vehicles, the door often carries a latch that engages a door striker pin to securely close the door. The door striker pin, which is fixated to the frame, is often installed by a technician that has to determine the location for installation of the door striker pin by trial and error. This method of using trial and error to determine the installation location of the door striker pin can result in the door striker pins of various vehicles being placed in differing locations, with the closing force needed to close the respective door varying. Potential customers visiting a dealership location with vehicles that require different closing forces to close the door may believe that such a variance indicates low quality. Further, the trial and error method of installing the door striker pin can take a significant amount of time, such as an average of 10-20 minutes, to install the door striker pin and reduce the number of vehicles that can be produced.

Figure 2:
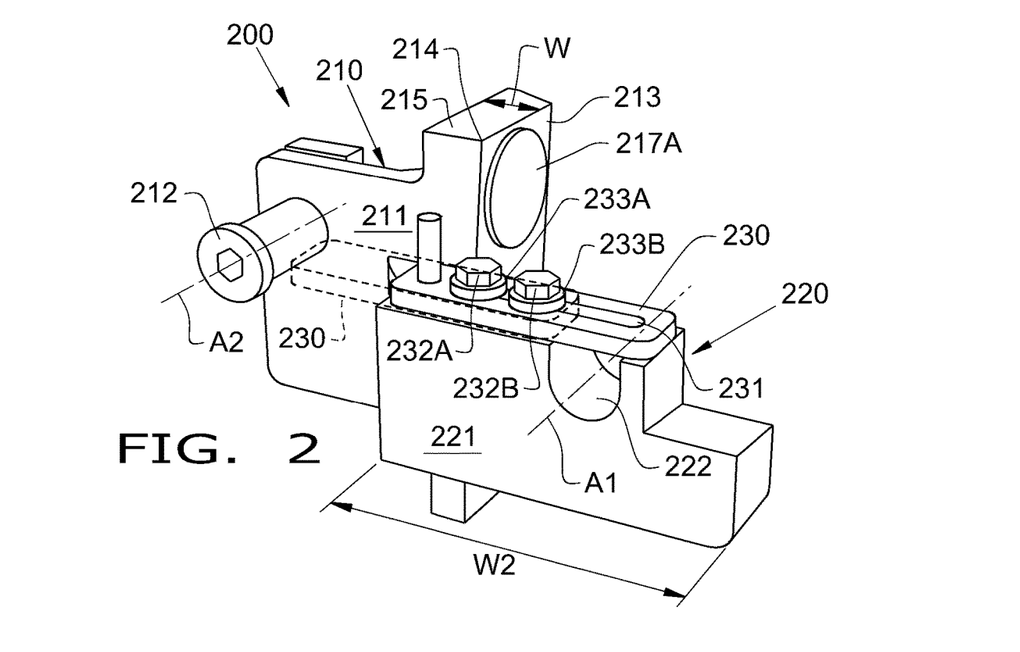
FIG. 2 illustrates a perspective view of an exemplary embodiment of a tool for installing a door striker pin, provided in accordance with the present disclosure.
Figure 3:
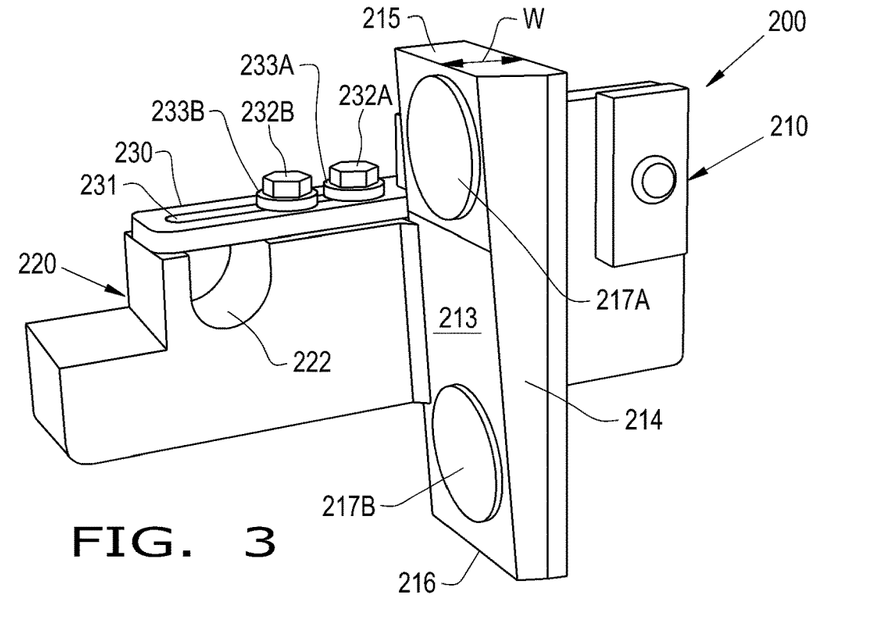
FIG. 3 illustrates another perspective view of the tool illustrated in FIG. 2.

To address some of the previously described issues, and referring now to FIGS. 2-3, an exemplary embodiment of a tool 200 for installing a door striker pin is provided according to the present disclosure. The tool 200 includes a latch engagement section 210 and a pin positioning section 220 coupled to the latch engagement section 210. The tool 200 may comprise any suitable material, including but not limited to a metal, such as a non-ferrous metal, and/or a polymer. In some embodiments, the tool 200 comprises a molded polymer so the tool 200 can be fabricated in an economical manner.

The latch engagement section 210 has a first surface 211, a striker pin 212 extending from the first surface 211, and an abutment surface 213 that extends generally orthogonal to the first surface 211. As used herein, "generally orthogonal" refers to the first surface 211 and the abutment surface 213 forming an angle that is between 85° and 95°. The first surface 211 may have any suitable shape, such as angled rectangular with or without a cutout. The abutment surface 213 may be formed as part of a spacer section 214 that has a width W chosen so the pin positioning section 220 is properly oriented to install a door striker pin, as will be described further herein. In some embodiments, the width W of the spacer section 214 tapers so the width W is at a maximum near a top surface 215 of the spacer section 214 and is at a minimum near a bottom surface 216 of the spacer section 214.

The pin positioning section 220 is coupled to the latch engagement section 210 and includes a positioning surface 221 with a striker pin slot 222 formed therethrough. The striker pin slot 222 extends in parallel with the striker pin 212 so an axis A1 that extends through the striker pin slot 222 is parallel to an axis A2 defined by the striker pin 212. The striker pin slot 222 is positioned in the positioning surface 221 such that the striker pin slot 222 is aligned with a striker pin installation location, such as a door striker pin slot in a frame described further herein, when the striker pin 212 of the latch engagement section 210 is engaged with a latch of a door (also described further herein) and the abutment surface 213 rests against a frame to which the door is pivotably coupled. As illustrated, the striker pin slot 222 may have a curved shape, which can be adjusted to tightly hold a door striker pin therein. The pin positioning section 220 may define a width W2 that is chosen so the striker pin slot 222 is properly positioned to align with the striker pin installation location during use of the tool 200. In some embodiments, the pin positioning section 220 is coupled to the first surface 211 of the latch engagement section 210 and the positioning surface 221 extends in parallel with the first surface 211.

In some embodiments, a cover 230 is slidably coupled to the pin positioning section 220 and is slidable between a first position, illustrated in solid lines in FIGS. 2-3, where the cover 230 closes the striker pin slot 222 and a second position, illustrated in dashed lines in FIG. 2, where the striker pin slot 222 is open. By providing a slidable cover 230, a door striker pin can be held securely in the closed striker pin slot 222 when the cover 230 is in the first position and the cover 230 can be slid to the second position to open the striker pin slot 222 for removing the tool 200 after installing the door striker pin. In the illustrated embodiment, the cover 230 has a cover slot 231 formed therein that holds one or more bolts 232A, 232B that have an accompanying washer 233A, 233B. The bolts 232A, 232B can be tightened or loosened to lock or unlock, respectively, the cover 230 and prevent or allow, respectively, sliding of the cover 230. It should be appreciated that other ways of holding a door striker pin in the striker pin slot 222 may be provided according to the present disclosure, and the illustrated cover 230 is just one example. It should be further appreciated that the cover 230 may be removed while installing a door striker pin, as illustrated in FIGS. 4-8.

In some embodiments, at least one fixater, illustrated as two magnets 217A, 217B, is associated with the abutment surface 213. While the fixaters 217A, 217B are illustrated and described as magnets, it should be appreciated that the fixaters 217A, 217B may be other types of elements that can reversibly fixate the tool 200 to a frame, including but not limited to a pad of a sticky substance, such as glue, or a physical fixation element such as a bolt, a screw, etc. The fixaters 217A, 217B can provide sufficient fixation so the tool 200 is resistant to moving while installing a door striker pin so the tool 200, and the door striker pin, does not move during the installation process.

Figure 4:
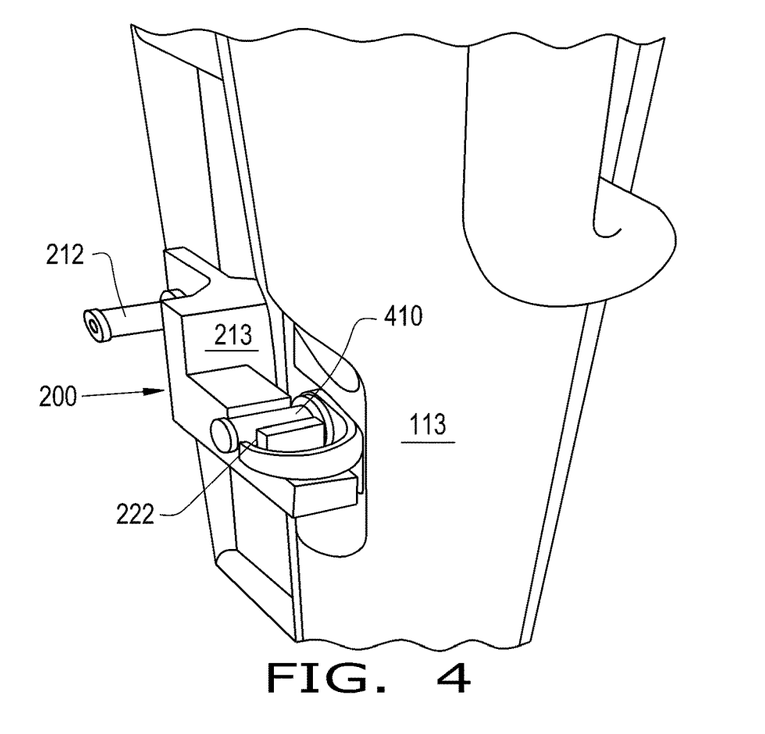
FIG. 4 illustrates a perspective view of the tool illustrated in FIGS. 2-3 holding a door striker pin and being affixed to a frame of the vehicle of FIG. 1.

Referring now to FIGS. 4-8, an exemplary embodiment of a door assembly, which may be door assembly 115, that is formed when using the tool 200 to install a door striker pin 410 is illustrated. As illustrated in FIG. 4, the tool 200 is positioned so the door striker pin 410, which is initially loosely placed adjacent to a door striker pin slot 411 of the second frame member 113, is held in the striker pin slot 222 of the tool 200. When the door striker pin 410 is held in the striker pin slot 222, the fixaters 217A, 217B can be affixed to the second frame member 113 to initially hold the tool 200 in place.

Figure 5:
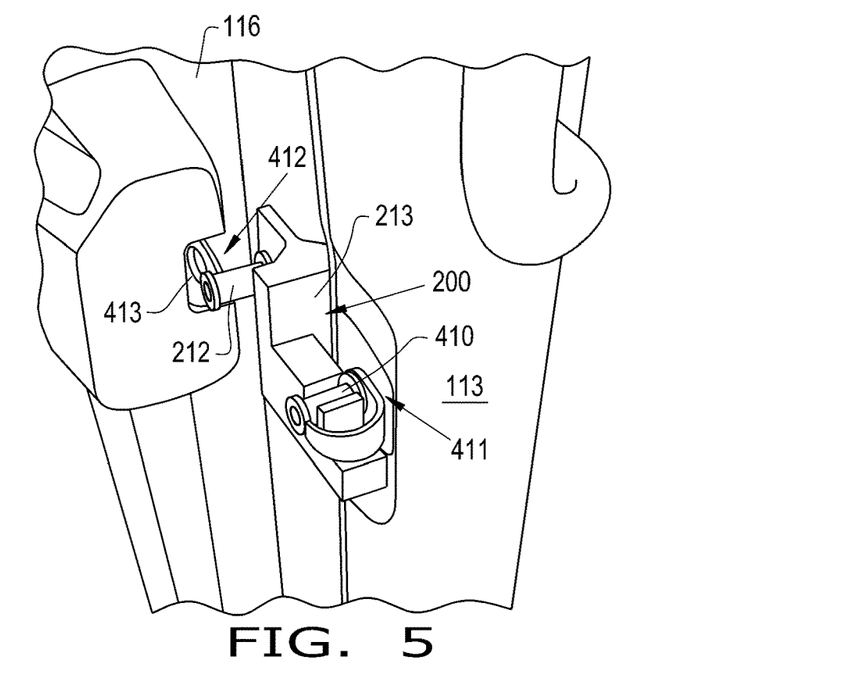
FIG. 5 illustrates a perspective view of a latch of a door of the vehicle of FIG. 1 being moved towards engagement with a striker pin of the tool of FIGS. 2-4.

Referring now to FIG. 5, it is illustrated that the door striker pin 410 is held in the striker pin slot 222 of the tool 200 and the door 116 is pivoted toward the second frame member 113, i.e., toward the closed position. As the door 116 is being brought toward the closed position, a latch 412 of the door 116 is brought toward the striker pin 212 of the tool 200. The latch 412 may include jaws 413 for grasping a striker pin, such as the striker pin 212 of the tool 200 as well as the door striker pin 410. In some embodiments, the striker pin 212 of the tool 200 and the door striker pin 410 are identical so engagement of the latch 412 with the striker pin 212 of the tool 200 approximates the engagement of the latch 412 with the door striker pin 410.

Figure 6:
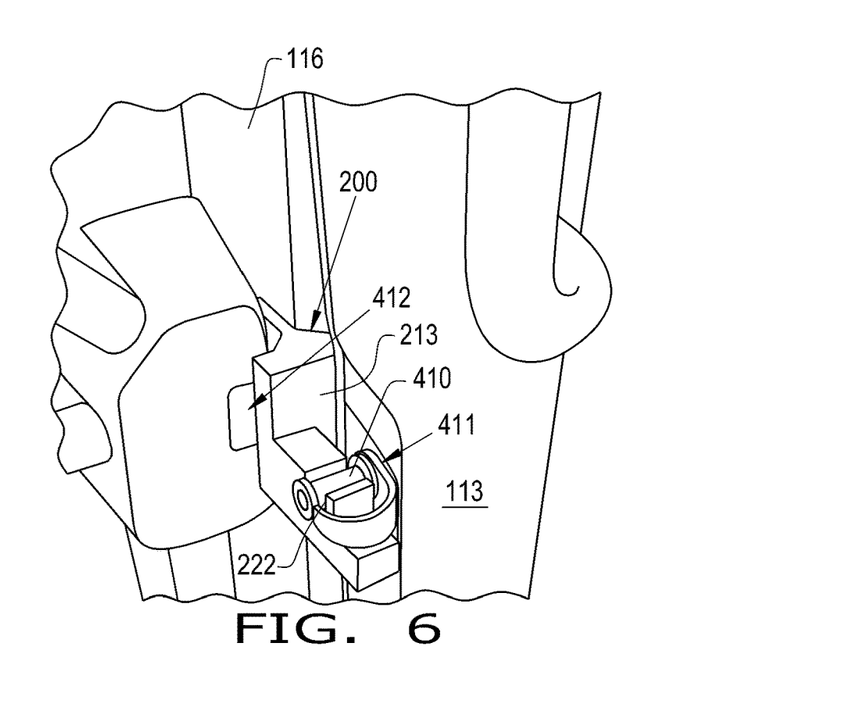
FIG. 6 illustrates the latch of the door of the vehicle engaged with the striker pin of the tool.

Referring now to FIG. 6, it is illustrated that the latch 412 of the door 116 has engaged the striker pin 212 of the tool 200, the door striker pin 410 is held in the striker pin slot 222, and the abutment surface 213 of the tool 200 is abutting against the frame 111, specifically against the second frame member 113. When the tool 200 is in this position, the striker pin slot 222 of the tool 200 is aligned with the door striker pin slot 411 of the second frame member 113 so the door striker pin 410 is held in both the striker pin slot 222 of the tool 200 and the door striker pin slot 411 in the proper orientation. A user can then fixate the door striker pin 410 to the second frame member 113, such as by tightening the door striker pin 410 with a wrench, until the door striker pin 410 is prevented from going further into the door striker pin slot 411 by abutting against the tool 200, at which point the door striker pin 410 is properly oriented and located within the door striker pin slot 411.

Figure 7:
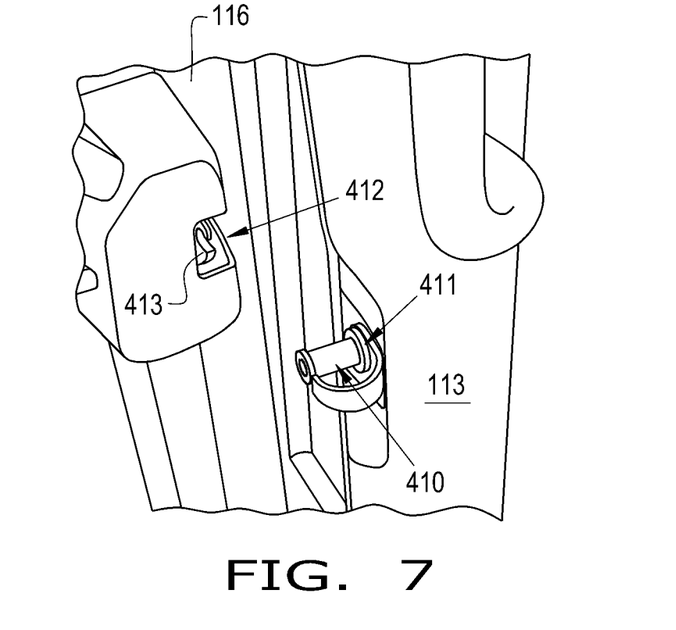
FIG. 7 illustrates the door striker pin fixated to the frame and the tool removed.
Figure 8:
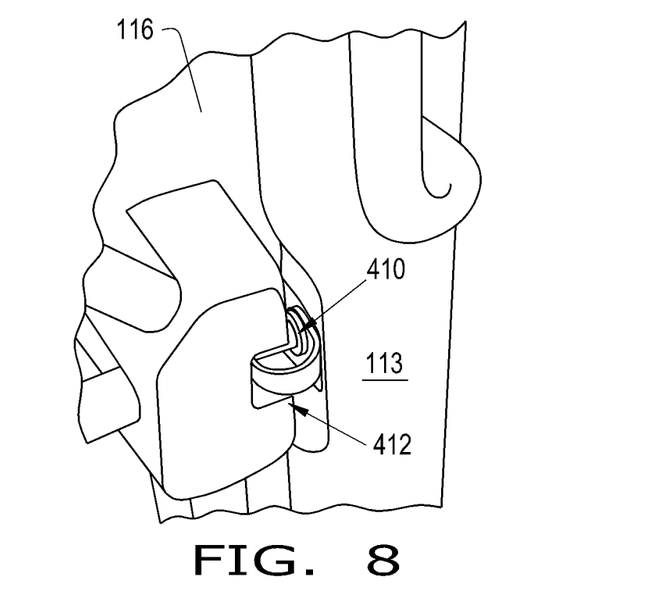
FIG. 8 illustrates the latch of the door properly engaged with the door striker pin after fixation.

The latch 412 of the door 116 is engageably aligned with the door striker pin 410 when the door striker pin 410 is in the proper location and orientation, as illustrated in FIG. 7 with the tool 200 removed. When the door striker pin 410 and the latch 412 are engageably aligned, pivoting of the door 116 to the closed position causes the latch 412 to engage with the door striker pin 410 and secure the door 116 in the closed position, as illustrated in FIG. 8. In this respect, using the tool 200 to position and orient the door striker pin 410 with the proper positioning and location allows the installer to precisely and accurately install the door striker pin 410 to the second frame member 113.

While one exemplary embodiment of a tool 200 provided according to the present disclosure is illustrated, it should be understood that tools provided according to the present disclosure can be configured in a variety of ways. Since the correct location and orientation of the door striker pin that is to be installed will vary based on various dimensions of the frame and the door, forming the tool is generally specific to a particular model of vehicle. For example, one way to determine the configuration of the tool is to initially install a door striker pin in a frame of a vehicle so the latch of the door of the vehicle engages the door striker pin with a desired closing force, which may be measured in any suitable way. Once it is confirmed that the door closes and is secured with the desired closing force, measurements can be taken to determine how the latch engagement section and the pin positioning section of the tool should be configured so the striker pin of the latch engagement section engages the latch of the door, the abutment surface of the latch engagement section abuts against the frame, and the striker pin slot is properly aligned with the door striker pin slot. The measurements can be used, for example, to determine the positioning of the striker pin on the first surface of the latch engagement section, the width of the spacer section having the abutment surface, and the positioning of the striker pin slot in the positioning surface. A corresponding tool incorporating the correct positioning of each of the elements can then be created and used to correctly install door striker pins in other similar vehicles with the same closing force.

From the foregoing, it should be appreciated that the tool 200 provided according to the present disclosure allows an installer to precisely, accurately, and quickly install a door striker pin 410 in a frame 111 of a vehicle 100 so a latch 412 of the door 116 can engage the door striker pin 410 and be securely closed when the door 116 pivots to the closed position. Further, because the tool 200 can be used to install multiple door striker pins 410 in the same manner, each door striker pin 410 installed using the tool 200 should result in similar, if not identical, door closing forces required for the door 116 of each vehicle 100 to close. Thus, the tool provided according to the present disclosure can simplify the procedure for installing door striker pins in vehicles and also ensure the doors of the vehicles close in a similar manner so a potential customer does not believe that the door of one vehicle is incorrectly installed compared to the door of a different vehicle.

Figure 9:
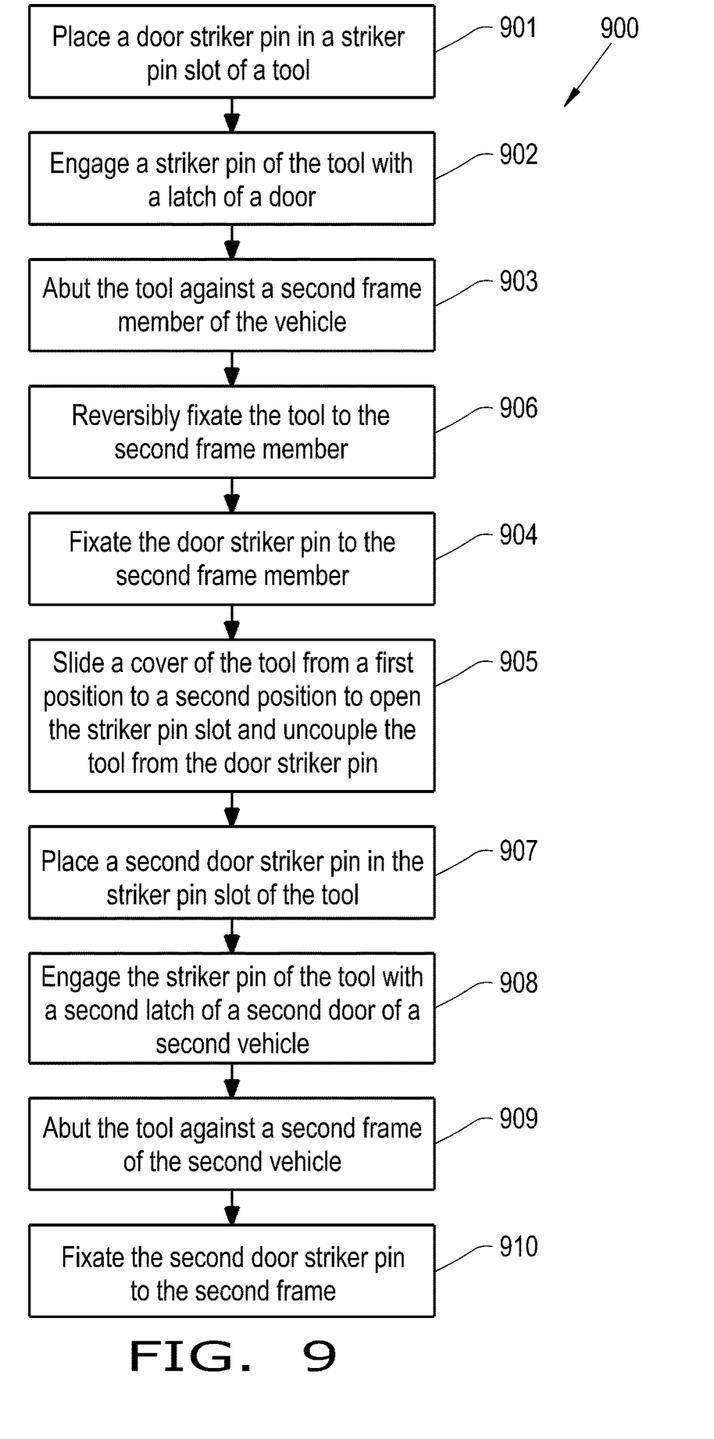
FIG. 9 illustrates an exemplary embodiment of a method of using a tool to install at least one door striker pin at least one vehicle, provided in accordance with the present disclosure.

Referring now to FIG. 9, an exemplary embodiment of a method 900 of using a tool, such as the previously described tool 200, to install at least one door striker pin 410 in at least one vehicle 100 is illustrated. The at least one vehicle includes a first vehicle 100 having a frame 111 with a first frame member 112 and a second frame member 113 and a door 116 pivotably coupled to the first frame member 112 and including a latch 412. The method 900 includes placing 901 a door striker pin 410 in a striker pin slot 222 of the tool 200; engaging 902 a striker pin 212 of the tool 200 with the latch 412 of the door 116; abutting 903 the tool 200 against the second frame member 113; and fixating 904 the door striker pin 410 to the second frame member 113 while the door striker pin 410 is placed 901 in the striker pin slot 222, the striker pin 212 is engaged 902 with the latch 412 of the door 116, and the tool 200 is abutted 903 against the second frame member 113. By fixating 904 the door striker pin 410 to the second frame member 113 in this manner, the door striker pin 410 can be precisely and accurately installed. In some embodiments, the method 900 further includes sliding 905 a cover 230 of the tool 200 from a first position to a second position to open the striker pin slot 222 so the tool 200 can be uncoupled from the door striker pin 410 after the fixating 904. In some embodiments, the method includes reversibly fixating 906 the tool 200 to the second frame member 113, which may include affixing at least one magnet 217A, 217B to the second frame member 113.

In some embodiments, the at least one vehicle includes a second vehicle that is similar to the first vehicle 100 and includes a second frame and a second door pivotably coupled to the second frame and including a second latch. The method 900 may further include placing 907 a second door striker pin in the striker pin slot 222 of the tool 200; engaging 908 the striker pin 212 of the tool 200 with the second latch of the second door; abutting 909 the tool 200 against the second frame of the second vehicle; and fixating 910 the second door striker pin to the second frame while the second door striker pin is placed in the striker pin slot 222, the striker pin 212 is engaged with the second latch of the second door, and the tool 200 is abutted against the second frame. In this respect, the steps 907, 908, 909, and 910 are similar to the steps 901, 902, 903, and 904 that are performed to fixate the door striker pin 410 in the first vehicle 100, but are performed to fixate a door striker pin 410 in a second vehicle. Since the door striker pin 410 is installed in the first vehicle 100 using the tool 200 in a similar fashion to install a door striker pin in the second vehicle, in some embodiments a closing force to engage the latch 412 of the first vehicle 100 with the door striker pin 410 is the same as a closing force to engage the second latch of the second vehicle with the second door striker pin after fixating 904 the door striker pin 410 to the second frame member 113 and after fixating 910 the second door striker pin to the second frame. In this respect, the doors of both vehicles should have generally the same closing force so both doors securely close and engage their respective latches in a similar manner.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A tool for installing a door striker pin, the tool comprising:
   a latch engagement section comprising a first surface, a striker pin extending from the first surface, and an abutment surface that extends generally orthogonal to the first surface;
   a pin positioning section coupled to the latch engagement section and comprising a positioning surface with a striker pin slot formed therethrough that extends in parallel with the striker pin, the striker pin slot being positioned in the positioning surface such that the striker pin slot is aligned with a striker pin installation location when the striker pin of the latch engagement section is engaged with a latch of a door and the abutment surface rests against a frame to which the door is pivotably coupled; and
   a cover slidably coupled to the pin positioning section such that the cover is slidable between a first position where the cover closes the striker pin slot and a second position where the striker pin slot is open
   wherein the cover defines a cover slot extending along at least a portion of a length of the cover, further comprising a fastener extending through the slot into the pin positioning section, wherein loosening the fastener permits sliding the cover between the first position and the second position.

2. The tool of claim 1, wherein the latch engagement section comprises at least one fixater associated with the abutment surface and configured to reversibly fixate the tool to the frame.

3. The tool of claim 2, wherein the at least one fixater comprises a magnet.

4. The tool of claim 1, wherein the pin positioning section is coupled to the first surface of the latch engagement section.

5. The tool of claim 4, wherein the positioning surface extends in parallel with the first surface.

6. A tool for installing a door striker pin on a vehicle including (a) a frame comprising a first frame member coupled to a second frame member where the second frame member comprises a door striker pin slot and (b) a door pivotably coupled to the first frame member and comprising a latch the tool comprising:
   a latch engagement section comprising a first surface and a striker pin extending from the first surface and configured to engage with the latch;
   a spacer section coupled to the latch engagement section and comprising an abutment surface extending generally orthogonal to the first surface and configured to abut against the second frame member, the spacer section having a tapered profile; and
   a pin positioning section coupled to the latch engagement section and comprising a positioning surface with a striker pin slot formed therethrough that extends in parallel with the striker pin, the striker pin slot positioned to align with the door striker pin slot and configured to hold a door striker pin to facilitate properly aligning the door striker pin within the door striker pin slot such that the latch of the door can be engageably aligned with the door striker pin.

7. The tool of claim 6, wherein the tool further comprises a cover slidably coupled to the pin positioning section, the cover being slidable between a first position where the cover closes the striker pin slot and a second position where the striker pin slot is open.

8. The tool of claim 6, wherein the latch engagement section comprises at least one fixater associated with the abutment surface and reversibly fixated to the second frame member.

9. The tool of claim 8, wherein the at least one fixater comprises a magnet.

10. The tool of claim 6, wherein the pin positioning section is coupled to the first surface of the latch engagement section.

11. The tool of claim 10, wherein the positioning surface extends in parallel with the first surface.

12. The tool of claim 6, wherein the spacer section has a larger width at an upper end thereof and a smaller width at bottom end thereof such that the abutment surface is angled.

* * * * *